United States Patent [19]

Dorai

[11] Patent Number: 5,410,093
[45] Date of Patent: Apr. 25, 1995

[54] METHOD FOR REMOVING TRANSESTERIFICATION CATALYST FROM POLYETHER POLYOLS

[75] Inventor: Suriyanarayanan Dorai, Hockessin, Del.

[73] Assignee: E. I. Du Pont de Nemours and Company, Wilmington, Del.

[21] Appl. No.: 198,172

[22] Filed: Feb. 17, 1994

[51] Int. Cl.$^6$ ............................................. C07C 41/04
[52] U.S. Cl. ..................................... 568/621; 568/617
[58] Field of Search ................................. 568/617, 621

[56] References Cited

U.S. PATENT DOCUMENTS

| | | | |
|---|---|---|---|
| 3,833,669 | 9/1974 | Gehm et al. | 260/615 B |
| 4,137,396 | 1/1979 | Louvar et al. | 536/4 |
| 4,306,943 | 12/1981 | Mori et al. | 203/29 |
| 4,371,713 | 2/1983 | Matsumoto et al. | 568/617 |
| 4,460,796 | 7/1984 | Mueller | 568/617 |
| 4,985,551 | 1/1991 | Perry et al. | 536/18.6 |

FOREIGN PATENT DOCUMENTS 62-20970  4/1987  Japan .

*Primary Examiner*—Howard T. Mars

[57] ABSTRACT

An improved method for recovering purified poly(tetramethylene ether) glycol or similar polyether polyol from an aqueous solution of polymer containing an alkaline metal catalyst residue involving the addition of a stoichiometric excess of magnesium sulfate or sulfite followed by evaporation of water and separation of molten polymer from precipitated solid phase (i.e., from magnesium hydroxide, alkaline metal sulfate/sulfite, and excess magnesium sulfate/sulfite). Such a process results in essentially complete removal of any basic transesterification catalyst and water without significant lost of poly(tetramethylene ether) glycol or the like.

4 Claims, 1 Drawing Sheet

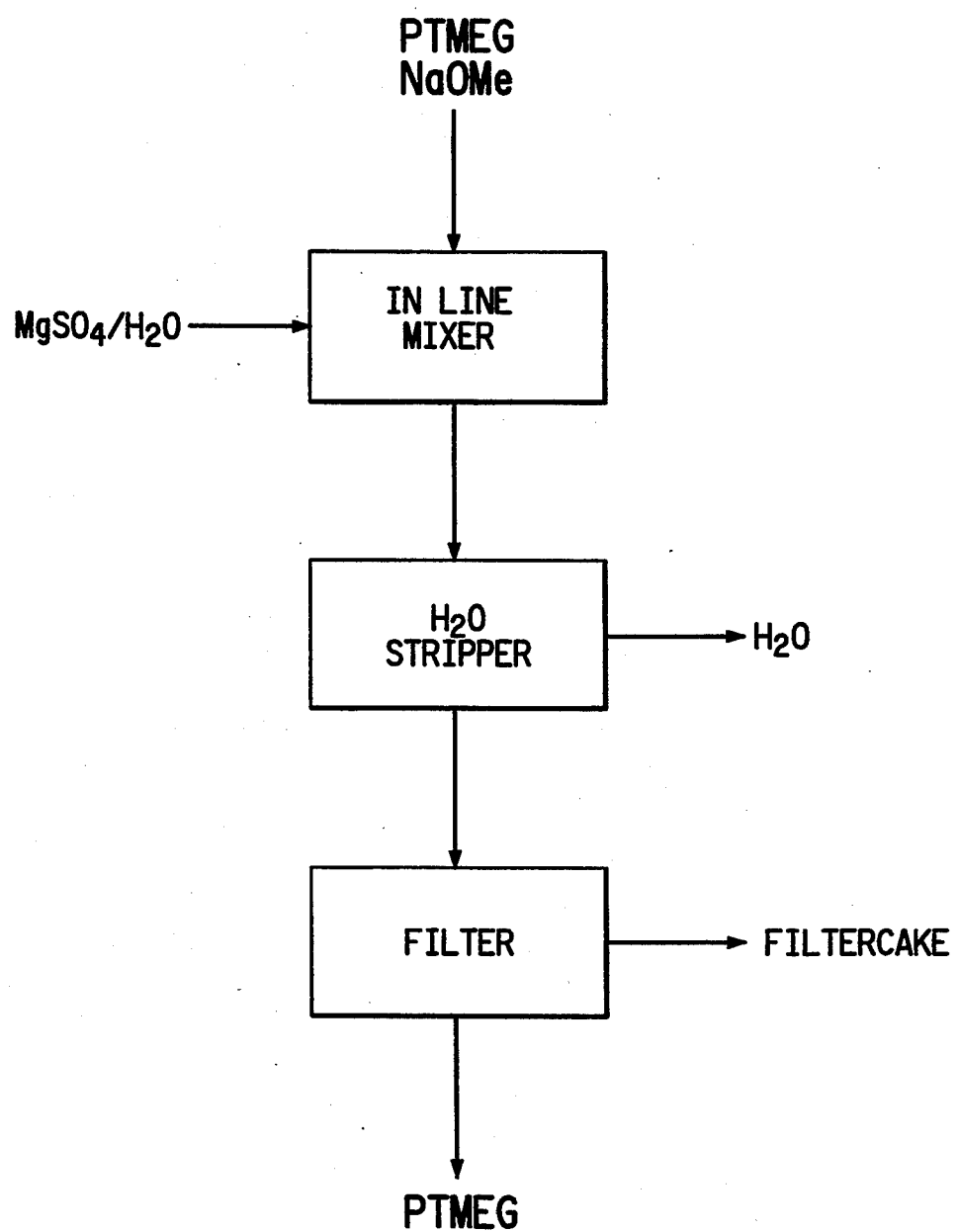
FIGURE

METHOD FOR REMOVING TRANSESTERIFICATION CATALYST FROM POLYETHER POLYOLS

BACKGROUND OF THE INVENTION

1. Field of the Invention

This invention relates to a method for removing transesterification catalyst from polyether polyols. More specifically but not by way of limitation, the present invention relates the use of $MgSO_4$ to remove any alkaline catalyst residual in poly(tetramethylene ether) glycol (PTMEG).

2. Description of the Related Art

It is well known that in the preparation of polyether polyols, generally, and specifically the polymerization of THF and/or THF with comonomers in which acetic acid and acetic anhydride are used the intermediate products will contain acetate or other end groups which must be subsequently convert to the hydroxyl functionality prior to ultimate use. Therefore a transesterification process is frequently employed which uses methanol in the presence of strongly alkaline catalysts. Typical catalysts for this purpose are alkali metal hydroxides or alkoxides. Consequently catalyst is present in the product and it is generally accepted that even trace amounts have a very detrimental effect on the properties of polyurethanes and polyester elastomers which are major products made from polyether glycols. Thus it has been recognized in the art that when the hydrolysis or alcoholysis has ended, the basic catalyst added must be virtually completely removed from the resulting poly(tetramethylene ether) glycols in a simple manner and without loss of useful product.

Several methods for removing alkaline transesterification catalyst residuals from polyols are described in the literature. For example, U.S. Pat. No. 4,137,396 describes a process, which is useful for polyols in the molecular weight range of 300 to 26,000, using adsorbents, such as synthetic magnesium silicate, in combination with both a hydrocarbon solvent and water to remove the alkaline catalysts. The catalysts comprise hydroxides and alkoxides of Li, Na, K, Rb and Cs. The normal concentrations of catalyst in commercially prepared polyols is described as being in the range of 1700 to 4000 ppm and it is said to be desirable to reduce this to a level of about 5 ppm or less. However no mention is made in the patent of actual catalyst levels after conducting the process. The process also uses solvents to recover polyols from the adsorbents and the solvents have subsequently to be removed from the polyols.

U.S. Pat. No. 4,985,551 describes a process for purification of polyols in the molecular weight range of 500 to 10,000 using a strongly acidic, macroporous cation exchange resin to remove alkaline catalysts. The catalysts comprise hydroxides and alkoxides of Li, Na, K, Rb and Cs. The use of an aqueous alcoholic solution of the polyols leads to greater mass transfer between the polyol and ion exchange resin bed. Alkali earth metal concentrations of less than 1 ppm are reached at greater than 50% utilization of resin capacity.

U.S. Pat. No. 4,460,796 discloses a process for the purification of poly(tetramethylene ether) glycols which uses orthophosphoric acid to neutralize the basic catalyst followed by separation of the inorganic salts formed. The catalysts comprise alkali metal hydroxides or alkoxides and calcium oxide or calcium hydroxide. An essential feature of the process is the use of the correct ratio of equivalents of alkaline catalyst to orthophosphoric acid.

A process for the purification of polyether glycols containing alkaline catalyst is described in Japanese Kokoku Sho 62-20970. Alkaline catalyst such as sodium or potassium hydroxide or methoxide is neutralized by the addition of an acidic salt in the presence or absence of water followed by dehydration and filtration. The acidic salt used includes bisulfates, bisulfites, bicarbonates and hydrogen phosphates of sodium or lithium. The neutralization is conducted at 30°-100° C. and dehydration is conducted 100°-140° C. under reduced pressure.

U.S. Pat. No. 4,306,943 describes a process for the purification of polyether polyols containing alkaline catalyst by neutralizing with a mineral acid having a dissociation constant greater than 0.001 at 25° C., adding the hydrate of a metal salt to promote crystal growth of the salt formed by neutralization, distilling off water and filtering. By promoting crystal growth the filtration of salt formed is facilitated.

U.S. Pat. No. 3,833,669 describe various historical approaches to catalyst removal employing acid neutralization, associated salt formation followed by precipitate removal and identifies respective problems with such acid/base neutralization techniques. Specifically, this reference identifies the necessity to neutralize exactly to the equivalence point, the tendency for formation of fine crystalline states and possible acid discoloration of the polyalkylene ethers. The reference also acknowledges the use of a volatile acid including gaseous $CO_2$ for overcoming some of the inherent problems and then discloses and claims an improved $CO_2$ neutralization technique performed in the presence of a basic magnesium salt (e.g., magnesium oxide, carbonate or hydroxide) preferably in large excess and a few percent by weight of water. In this process the alkali metal catalyst residue, upon $CO_2$ neutralization is incorporated into the magnesium basic salt as an alkali-magnesium carbonate double salt which is then separated from the molten polyether polyol.

SUMMARY OF THE INVENTION

The present invention involves a novel process for removing alkaline transesterification catalyst from polyether polyols (e.g., PTMEG or copolymer thereof typically having a molecular weight ranging from 200 to 10,000) comprising mixing with the polyether polyol a magnesium salt selected from a group comprising magnesium sulfates, and/or sulfites in an amount which exceeds the stoichiometric equivalent of the alkalinity of the polyether polyol, dehydrating the mixture and thereafter separating insoluble species and recovering polyether polyol free from catalyst. Using an excess of the magnesium salts ensures that all the catalyst is converted to insoluble species. These insoluble species together with the excess of magnesium salts, which are also insoluble in anhydrous polyether polyols, are removed by conventional procedures such as filtration, centrifugation, or the like. The process is superior to other methods that have been described because there is no need for precise control of the amount of magnesium salts added, no risk of excess acid, no solvents are used which require a solvent removal step in order to recover the desired product and there is no significant loss of polyether glycols.

BRIEF DESCRIPTION OF THE DRAWING

FIG. 1 is a schematic representation of one particular embodiment according to the present invention illustrating a continuous process for the removal of alkaline catalyst residue associated with use the of sodium methoxide as transisterification catalyst to produce poly(tetramethylene ether) glycol and subsequent recovery of purified poly(tetramethylene ether) glycol.

DESCRIPTION OF THE PREFERRED EMBODIMENTS

The novel process according to the present invention for removing alkaline transesterification catalyst (i.e., more explicitly the removal of alkaline catalyst residue) from polyether polyol comprises broadly the acts of mixing with the polyether polyol a magnesium salt such as a sulfate or sulfite aqueous solution in an amount which exceeds the stoichiometric equivalent of the alkalinity of the polyether polyol, dehydrating the mixture and separating insoluble species thus recovering polyether polyol free from catalyst residue. The purified polyether polyol thus produced is highly suitable for producing the highest grade polyurethanes (e.g., spandex) and polyester elastomers.

The process for preparing pure polyether glycols, again according to the instant invention, includes (a) for batchwise operation, providing a reactor to which polyether glycols containing alkaline catalyst and an excess of magnesium salt are added and mixed; and (b) for continuous mode operation, providing a mixer into which monitored polyether glycols containing alkaline catalyst and an excess of neutralizing salt are fed concurrently and essentially continuously. Further, in both the batchwise and continuous operation provision for at least dehydrating the mixture to completely insolubilize all salts present and provision for removing insoluble species and recovering high purity polyether polyols must be present. Typically this will require a vacuum or low pressure chamber or drying facility and equipment or the like and at least one filter or other suitable physical separation equipment. A more detailed description of a typical continuous system according to the instant invention will presented in the Examples along with reference to the Figure.

The polyether polyols compositions which may be purified by the process of the present invention are generally any polyether containing an undesirably high level of alkaline metal catalyst residue such as polyethers typically produced via a transesterification reaction. More specifically, polyethers derived from the polymerization of tetrahydrofuran (THF) and/or 3-methyl tetrahydrofuran (3-methyl THF) as well as the copolymerization of THF and/or 3-methyl THF with an alkylene oxide or equivalent comohomer containing undesirable levels of alkalinity are particularly amenable to the instant purification process. Typically the products of the initial polymerization process are in the form of acetates (or similar terminal ester groups) which are converted to the hydroxyl group terminated glycols by reacting them with methanol in the presence of transesterification catalysts. The molecular weight range of the polyether glycol compositions is from about 200 to about 10,000. A preferred composition is poly(tetramethylene ether) glycol (PTMEG) having a molecular weight ranging from about 200 to about 5000. PTMEG finds large-scale use in making polyurethanes and polyester elastomers.

The transesterification catalyst residue that has to be removed is generally involves the alkali metal hydroxides or alkali metal alkoxides ranging from methoxide to butoxide, most typically sodium hydroxide or sodium methoxide because of availability and economy. Other catalysts which are less commonly employed in the transesterification process and which may be removed by the instant process include the hydroxides and alkoxides of lithium, potassium, rubidium or cesium as well as certain alkaline earth metal hydroxides and alkoxides (e.g. calcium and barium alcohates). The normal concentrations of such catalyst in polyether polyols may range from about 250 to about 4000 parts per million (ppm) based on PTMEA (i.e., PTMEG diacetate). It is desirable to decrease the level of any metal cation present to less than one ppm and most typically below 0.5 ppm. An alternative way of characterizing the final composition is by means of the alkalinity number (AN) of the purified polyether polyol. Preferably this alkalinity number should not exceed 3.0 and most preferably be between −1 and +0.5. The alkalinity number, which is expressed as milliequivalents OH per kg sample multiplied by 30, is measured as follows:

15.0 Grams (to the nearest 0.01 g) of polyether glycols is dissolved in an alkaline alcoholic solvent and titrated with standard aqueous hydrochloric acid solution measuring the pH during the addition of the hydrochloric acid. A blank titration is also conducted on the same volume of solvent. The difference in the amount of titrant required to bring the blank and the sample to a pH of 5.30 is then used to calculate the alkalinity number as shown below:

$$AN(\text{Meq.OH/kg} \times 30) = \frac{(A - B) \times N \times 1000 \times 30}{C}$$

Where:
A = mL of HCl used for the sample
B = mL of HCl used for the blank
N = exact normality of HCl
1000 = conversion of g to kg
30 = arbitrary factor employed to adjust the results closer to unity
C = weight (g) of sample = 15 (for a 15 gram sample)
Report the AN value as follows:
a. If the value is between +1.0 and −1.0 report to two significant figures
b. If the value is > +1 or < −1 report to one significant figure The magnesium salts that are mixed with polyether polyols to remove the alkaline catalyst are selected from a group comprising the sulfates, and sulfites, of magnesium including mixtures of these compounds. These salts convert the alkali metal cations of the transesterification catalysts to species that are very insoluble in polyether polyols thus facilitating their removal. Magnesium sulfate is the most preferred salt because of its effectiveness, ready availability and economy and it is particularly preferred for use in the purification of PTMEG because of the extensive commercial use of the latter in the preparation of elastomers. It is necessary for some water to be present for the reaction to go to completion. The magnesium salts are preferably added as aqueous solutions, since this is the most convenient way to conduct the process. The amount of solution added must be sufficient to bring the water content of the polymer mixture to between 3 and 15 weight percent more typically to between 5 and 12 weight percent.

Alternatively, but less preferred, finely powdered hydrates of the magnesium salts may be used provided sufficient water is present in the hydrates. However, the reaction goes to completion more rapidly if relatively dilute aqueous solutions are used, although from the standpoint of the subsequent dehydration step it is economically advantageous to minimize the amount of water added.

A particularly important aspect with respect to achieving virtually complete removal of alkali metal species is to use a stoichiometric excess, based on the alkalinity, of the magnesium salt. This may extend over a wide range, from a minimal excess to a large excess but typically will be in the range of 10 to 300 weight percent. The magnesium salts are insoluble in PTMEG and any excess is easily removed during the solids separation procedure. The alkalinity number of the untreated PTMEG may be measured in order to determine the stoichiometric amount of magnesium salt required.

The purification can be carried out in a batchwise manner. However it is much preferred to conduct the process in a continuous mode particularly on a commercial scale, as illustrated schematically in the Figure. The reactants (e.g., $MgSO_4/H_2O$ and the PTMEG containing the alkaline catalyst NaOMe) are fed concurrently to an in-line mixer 10, as represented in the Figure, or to a continuously stirred reactor, in proportions which maintain a stoichiometric excess of neutralizing salt over the level of alkaline catalyst in the polyether glycols.

The contact time in the mixer is a function of the mixer dimensions, feed rates, flow rates and turbulence and these are adjusted so that the alkaline catalyst is quantitatively reacted with magnesium salt. Again monitoring may be accomplished by removing samples from the in-line mixer discharge stream and determining the alkalinity number. The mixer discharge stream is fed to a water stripper 12, again as illustrated in the Figure, where the mixture is dehydrated to ensure that all alkali metal salts and excess magnesium salt are insolubilized. Typically the removal of water is carried out under reduced pressure at about 140° C.; however other temperatures and pressures could be employed as generally known in the art.

The dehydrated slurry consisting of polyether glycols and inorganic salts is then treated to separate the solids and recover the purified polyether glycols. This is best accomplished by filtration as represented by filter 14 in the Figure. Conventional vertical filters are suitable for this purpose. Filtration rate can be enhanced by applying pressure and maintaining the temperature in excess 70° C. to decrease the polymer viscosity. The addition of filter aids (not illustrated in the Figure) is also very beneficial in expediting filtration.

A further advantage of the process of this invention is that the filter cake consists of non-toxic salts which present no waste disposal problems. The filtrate consists of high purity polyether glycols suitable for use in the production of polyurethanes and polyester elastomers.

Although filtration is generally preferred for separation of solids other well known methods such as sedimentation or centrifugation may be used. Such methods are less desirable due to greater losses of PTMEG or greater cost of equipment.

The following examples are presented to more fully demonstrate and further illustrate various individual aspects of the present invention. In doing so, PTMEG is intentionally employed as illustrative of the polyether polyol, sodium methoxide as illustrative of the transesterification catalyst and similarly magnesium sulfate as a specific magnesium salt with certain sequences of steps and conditions all as being illustrative only. As such the example are felt to be non-limiting and are meant to illustrate the invention but are not meant to be construed as unduly limiting in any way.

In performing the following examples a pilot plant scale continuous process was employed. The process involved a three unit operation essentially as conceptually illustrated in the Figure. An in-line mixer was used to mix PTMEG/NaOMe and aqueous $MgSO_4$ solution continuously which in some runs were then introduced optionally into a stirred tank. The agitated tank provided some hold-up time for the desired reactions with the magnesium salt. The reaction product stream was sent to a vacuum stripper (dryer) via a 6 inch packed section to eliminate any back-mix. A 2 to 3% solution of $MgSO_4$ was used to convert the NaOMe to $Na_2SO_4$ and $Mg(OH)_2$.

In order to avoid initial problems largely due to inadequate $MgSO_4$ feed as the $MgSO_4$ feed line plugged with sediments, an increased $MgSO_4$ feed ($>70\%$ excess) was used to obtained perfectly neutralized product with color less than 10 APHA units. Independently, it was demonstrated in the lab that an excess of $MgSO_4$ has no effect on the product alkalinity. $MgSO_4$ was also shown to be completely insoluble in PTMEG even if PTMEG contained water up to 400 ppm.

Further, to virtually eliminate the previous frequent plugging of the lines and mixing system a bag filter was installed downstream of the in-line mixer. The bag filter functioned satisfactorily by removing the bulk of the precipitates from the reaction mixture. Further analysis showed that the solids comprise both of magnesium hydroxide and sulfate.

When using only in-line the mixer (no stirred tank) to effect the catalyst removal, PTMEG having a nominal number average molecular weight of 800 and purified in this fashion typically had a carbonyl ratio of $<1$ and an alkalinity number of zero (after filtration of solids). The finished product produced passed a gel test but had low concentrations of BHT (as BHT, the THF stabilizer was distilled off in the vacuum stripper). BHT deficiency, unfortunately induces peroxide formation which in turn was shown to produce colored prepolymer in urethane reaction. Adding BHT to PTMEG containing peroxide, as expected did not change the color. The peroxide formation, however, is nearly eliminated by adding BHT to the product in the pilot plant. Samples processed in this manner produced colorless prepolymer product.

The water concentration in the product was between 500–700 ppm. To make dry PTMEG, a continuous stirred tank was placed in series with the in-line mixer. The tank was an agitated steam-jacketed vessel equipped with nitrogen purge to accelerate the removal of water. Greater than 50% of the water was removed in the stirred tank and as a result the finished product produced was very dry ($<100$ ppm). The continuously stirred tank was provided with a centrifugal pump for circulation and transfer to the dryer. A Durco centrifugal pump similar to the ones used for water stripper performed exceptionally well.

A sparkler filter unit operation was employed as the final product filter. The bulk of the precipitates was removed in the bag filter which in turn has extended the sparkler filter life. Periodically, slight amounts of solids bleed-through which increased the alkalinity number slightly (0.20–0.40). Upon filtration of the sample in the lab the alkalinity number went to zero. The sparkler filter was precoated initially with standard supercell filteraid initially. Some amount of body feed of filter-aid was maintained to ensure complete solid removal. Thus the use of magnesium sulfate precipitation was shown to be a novel and robust method of removing the catalyst, producing consistent product quality.

Using the above described pilot plant the following continuous runs typify the process of the present invention.

CONTINUOUS RUN 1

Pilot Plant configuration: Only In-line mixer

PTMEG Feed to the Process:
$Mn = 1,680$
$Mw = 3,379$
NaOMe = 606 ppm
NaOAc = 110 ppm
(Sodium acetate is an impurity produced by reacting residual acetic acid present in PTMEA with sodium methoxide)
Flow rate of PTMEG/NaOMe = 51 lbs/hour
  $MgSO_4$ solution:
2.1% by weight $MgSO_4$ in the feed
Flow rate = 2.52 lbs/hr of solution
  Filtered product:
Alkalinity number = 0.4
Color (APHA) = 5
Water concentration = 33 1 ppm

CONTINUOUS RUN 2

Pilot Plant configuration: Combination of an in-line mixer and stirred tank

PTMEG Feed to the Neutralization Process:
$Mn = 836$
$Mw = 1670$
NaOMe = 620 ppm
NaOAc = 110 ppm
(Sodium acetate is an impurity produced by reacting residual acetic acid present in PTMEA with sodium methoxide)
Flow rate of PTMEG/NaOMe = 48 lbs/hour
  $MgSO_4$ solution:
2.% by weight $MgSO_4$ in the feed
Flow rate = 2.49 lbs/hr of solution
  Filtered product:
Alkalinity number = −0.1
Color (AHPA) = 5
Water concentration = 156 ppm Similar batch-wise runs result in excellent catalyst removal.

Having thus described and exemplified the invention with a certain degree of particularity, it should be appreciated that the following claims are not to be so limited but are to be afforded a scope commensurate with the wording of each element of the claim and equivalents thereof.

I claim:

1. A method for purifying polyether polyol comprising the steps of:
   (a) contacting an aqueous solution of polyether polyol containing a residual of an alkaline transesterification catalysis with a stoichiometric excess of magnesium sulfate, magnesium sulfite or mixture thereof, wherein said stoichiometric excess is based on amount of said alkaline transesterification catalysis residual;
   (b) removing water from said aqueous solution of step (a) at a temperature above the melt temperature of said polyether polyol thus producing a molten polyether polyol phase and a precipitated second phase comprising sulfate and/or sulfite salts of the alkaline metal of said transesterification catalyst, magnesium hydroxide, and excess magnesium sulfate and/or sulfide; and
   (c) separating the molten polyether polyol phase from the precipitated second phase thus recovering polyether polyol substantially free of water and residual catalysis.

2. A method according to claim 1 wherein said polyether polyol is poly(tetramethylene ether) glycol or a copolymer thereof.

3. A method according to claim 1 wherein said alkaline transesterification catalysis is selected from the group consisting of alkali metal hydroxide, alkali metal alkoxide, alkaline earth metal hydroxide, alkaline earth metal alkoxide, and mixtures thereof and said precipitated second phase comprises magnesium hydroxide, sulfate salts of said alkaline transesterification catalysis, and excess magnesium sulfate, magnesium sulfite or mixture thereof.

4. A method according to claim 2 wherein said contacting an aqueous solution of poly(tetramethylene ether) glycol is with a stoichiometric excess of magnesium sulfate and said precipitated second phase comprises magnesium hydroxide, sulfate salts of said alkaline transesterification catalysis, and excess magnesium sulfate.

* * * * *